US007415366B2

(12) United States Patent
Florenz et al.

(10) Patent No.: US 7,415,366 B2
(45) Date of Patent: Aug. 19, 2008

(54) ELECTRONIC FIELD DEVICE WITH A SENSOR UNIT FOR CAPACITIVE LEVEL MEASUREMENT IN A CONTAINER

(75) Inventors: Hans-Jörg Florenz, Neuffen (DE); Clemens Heileg, Offenburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 60 days.

(21) Appl. No.: 10/497,543

(22) PCT Filed: Nov. 30, 2002

(86) PCT No.: PCT/EP02/13537
§ 371 (c)(1),
(2), (4) Date: Jul. 28, 2006

(87) PCT Pub. No.: WO03/050480
PCT Pub. Date: Jun. 19, 2003

(65) Prior Publication Data
US 2007/0055463 A1 Mar. 8, 2007

(30) Foreign Application Priority Data
Dec. 12, 2001 (DE) ................. 101 61 069

(51) Int. Cl.
*G01F 23/00* (2006.01)
*G06F 17/00* (2006.01)
(52) U.S. Cl. .............. 702/57; 702/50; 702/52; 702/64; 702/65; 73/304 C
(58) Field of Classification Search ........... 702/57, 702/50, 52, 64, 65
See application file for complete search history.

(56) References Cited

U.S. PATENT DOCUMENTS

| 3,786,349 | A | * | 1/1974 | Devenyi ................. 324/658 |
| 4,451,894 | A | * | 5/1984 | Dougherty et al. ........ 702/52 |
| 5,406,843 | A | * | 4/1995 | Hannan et al. .......... 73/304 C |
| 5,477,473 | A | | 12/1995 | Mandl et al. |

(Continued)

FOREIGN PATENT DOCUMENTS

EP     0271849    6/1988

(Continued)

OTHER PUBLICATIONS

Translation of EP 0338400.*

*Primary Examiner*—Hal D Wachsman
(74) *Attorney, Agent, or Firm*—Bacon & Thomas, PLLC

(57) ABSTRACT

A field device electronics with a sensor unit for capacitive fill level measurements in a container, wherein the field device electronics is connected over appropriate signal paths with the sensor unit, wherein the field device electronics produces a voltage signal for driving the sensor unit and receives and evaluates a measurement current from the sensor unit. According to the invention, an analog/digital converter digitizing the analog measurement current, a microprocessor and a memory unit are present, wherein the microprocessor utilizes predetermined program routines to perform the production of the voltage signal and the evaluation of the measurement current and a compensation of interference parameters and a determination of the parameters of the sensor-container arrangement which are to be determined, with the associated programs being stored in the memory unit.

13 Claims, 3 Drawing Sheets

U.S. PATENT DOCUMENTS

| | | | |
|---|---|---|---|
| 6,073,488 A * | 6/2000 | Byatt et al. | 73/304 C |
| 6,854,055 B1 * | 2/2005 | Stinus et al. | 713/100 |
| 6,930,609 B1 * | 8/2005 | Florenz et al. | 340/612 |
| 2003/0192380 A1 * | 10/2003 | Florenz et al. | 73/304 C |

FOREIGN PATENT DOCUMENTS

| | | |
|---|---|---|
| EP | 0338400 | 10/1989 |
| EP | 1091199 | 4/2001 |
| EP | 1108984 | 6/2001 |

\* cited by examiner

ELECTRONIC FIELD DEVICE WITH A SENSOR UNIT FOR CAPACITIVE LEVEL MEASUREMENT IN A CONTAINER

FIELD OF THE INVENTION

The invention relates to a field device electronics with a sensor unit for capacitive fill level measurements in a container wherein the field device electronics is connected over appropriate signal paths with the sensor unit, produces a voltage signal ($sig_1$) for driving the sensor unit, and receives and evaluates a measurement current from the sensor unit.

BACKGROUND OF THE INVENTION

Field devices for capacitive fill level measurement have been known for many years. In these devices, a probe extending into the container forms a capacitor with the container wall. The capacitance of the capacitor created in this way depends on the fill level and the dielectric constant of the medium to be measured.

A possibility for measuring this capacitance is the so-called apparent current measurement method. In this, a conventional rectifying circuit is used to measure the amount of the alternating current flowing through the capacitor formed from probe, medium and container wall for given frequency and voltage. The apparent current is, however, not only dependent on capacitance, but also on the conductivity of the medium to be measured, a fact which leads, in practice, to inaccuracies in the measurement, since the conductivity depends, especially in the case of bulk goods, on different factors, such as e.g. temperature and humidity.

A method for suppressing the influence of this parallel conductivity is measurement at relatively high frequencies. Since the part (reactive current) of the apparent current flowing through the capacitance increases in proportion to the frequency, while the part caused by the conductivity remains constant, the capacitive part predominates practically always at high frequencies. However, experience shows that measurement at high frequencies (>100 kHz) leads to difficulties with long probes in the form of large, parasitic inductances.

Another method is to measure not the apparent current, but rather the reactive current at a phase difference of 90° between current and voltage, this corresponding to a pure capacitance measurement. This can be done with the help of a synchronous rectifying circuit. With this method, however, there is the disadvantage that e.g. in media with small dielectric constant and large conductivity, in which measurements using apparent current measurement are possible without problem, difficulties arise because reactive current practically disappears. Moreover, such conventional synchronous rectifier circuits have proven to be sensitive with respect to electromagnetic interferences.

SUMMARY OF THE INVENTION

An object of the invention is to provide a field device electronics having a sensor unit for capacitive fill level measurements in a container, being easy to adapt for given field conditions, and using the best-suited measuring method as a function of the given, concrete application.

The object is achieved according to the invention by the provision of an analog/digital converter for digitizing the analog measurement current; a microprocessor; and a memory unit, wherein: the microprocessor performs the production of the voltage signal ($sig_1$), the evaluation of the measurement current and a compensation of interference parameters, and a determining of the parameters of the sensor-container arrangement which are to be determined, according to predetermined program routines; and the associated programs are stored in the memory unit.

A main idea of the invention is to apply a microprocessor for a production of voltage signals, for an evaluation of the measurement current, for a compensation of interference parameters, and for an ascertaining of the parameters of the sensor-container arrangement which are to be determined, with the associated programs being stored in a memory unit. For evaluation by the microprocessor, the analog measurement current is digitized by means of an analog/digital converter. Use of a microprocessor makes it possible, in simple manner, to select and apply optimum measuring methods for the existing field conditions. Only the program needed for the measuring method is brought from the memory unit and executed.

In addition, use of the microprocessor makes it possible to produce different output signals, whose characteristics depend on the intended further use of the output signal, or, as the case may be, on the transmission protocol which is being used. Thus, for example, a 4-20 mA signal, a 0-10V signal, a PFM-signal (pulse frequency modulation signal), a binary switching signal, etc., can be produced. It is, furthermore, imaginable, that plural output signals (4-20 mA, 0-10V, PFM-signal, a binary switching signal, etc.) be produced and issued for different transmission protocols, or application purposes, as the case may be.

In one embodiment of the invention, the microprocessor executes a generator function for producing the voltage signal, wherein the measurement frequency of the voltage signal is set by the microprocessor.

In an advantageous embodiment of the invention, the microprocessor executes a frequency switching function for producing voltage signals of different frequencies.

The generator function can, for example, be realized by frequency division of the clock signal of the microprocessor, with the frequency divider being controlled by the frequency switching function depending on the desired measuring frequency of the voltage signal.

By dividing the processor clock signal, the voltage signal can be given practically any measuring frequency beneath that of the processor clock. Thus, the frequency switch can be realized, without problem, by programming. This has, on the one hand, the advantage that the electronics can be adapted for different applications and that, moreover, a simple compensation of the parallel conductivity can be achieved by alternatingly measuring with two different measuring frequencies.

For producing a sinusoidal voltage, a further development of the invention provides a lowpass filter, which converts the voltage signal into a sinusoidal voltage. It is, however, also possible to use any other signal form of defined harmonic content for the measuring.

For producing sinusoidal voltages of different frequencies, the lowpass filter, in an advantageous embodiment of the invention, uses adjustable limit frequencies, with the current limit frequency of the lowpass filter being set by the frequency switching function depending on the set measuring frequency of the generator for producing the voltage signal.

In a further development of the invention, before the evaluation, the measurement current is converted by a current/voltage converter into a measurement voltage proportional to the measurement current.

In an especially advantageous further development of the invention, the measurement voltage is rectified by means of a rectifier and forwarded through the analog/digital converter to the microprocessor for evaluation.

The rectifier includes a charging capacitor in one embodiment and can, for example, be provided in the form of a peak rectifier or a synchronous rectifier.

In a first measuring method, the microprocessor determines the measurement current level at a defined phase-shift angle with reference to the voltage signal, with the phase-shift angle being settable by the microprocessor.

In a second measuring method, the microprocessor alternately produces two voltage signals of differing frequencies and ascertains from their associated measurement currents the parameters of the sensor-container arrangement which are to be determined.

In an especially advantageous embodiment of the invention, the microprocessor produces the required phase-shift angle between the voltage signal and the measurement current by a phase-shift produced by the microprocessor between a synchronizing signal and the voltage signal, with the synchronizing signal triggering the synchronous rectifier.

Since the phase-shift angle, at which the current is measured by the probe, can be chosen within wide limits arbitrarily by the software, it is possible to switch between pure reactive current measurement (capacitance measurement), apparent current measurement (impedance measurement) and pure active current measurement (conductivity measurement).

Since the synchronization signal for the synchronous rectifier is generated independently in the microprocessor and not, as with conventional synchronous rectifier circuits, derived from the signal of an analog oscillator, this type of measurement is more insensitive to electromagnetic interferences.

In an especially advantageous embodiment of the invention, the microprocessor sets the measuring frequency of the voltage signal and/or the phase-shift angle for the evaluation of the measurement current, as a function of the parameters to be determined and/or the field conditions.

The parameters of the sensor-container arrangement to be determined can be, for example, an impedance and/or a capacitance and/or a conductivity.

The field conditions include, for example, the sensor/container geometry and/or the type of medium in the container and/or interfering parameters.

The microprocessor assumes, moreover, additional functions, such as linearizing and scaling of the measured signal and generates the output signal of the sensor.

In an especially advantageous embodiment of the invention, measurements are not made continuously, but, instead, separate sinusoidal bursts containing, for example, 1000 oscillations are produced and evaluated during a measurement cycle. Between the separate sinusoidal bursts lie pauses, with the lengths of the pauses being variable and determined, for example, by a random generator. In this manner, an increased insensitivity to stray electromagnetic interferences is achieved, since no continuous interactions between measurement signal and interfering signal can arise.

In a further, especially advantageous embodiment of the invention, the field device electronics is switched by the microprocessor in the pauses between the separate measurement cycles into an energy saving mode. During these pauses, there is also no current flowing through the probe. In this way, current consumption sinks to a fraction of the current consumption usual for capacitive sensors. This is especially of interest for NAMUR-applications, that is applications which involve measurement and control technology in the chemical industry.

The invention will now be explained in greater detail on the basis of the drawings, which show as follows:

DESCRIPTION OF THE PREFERRED EMBODIMENTS

Figure 1:
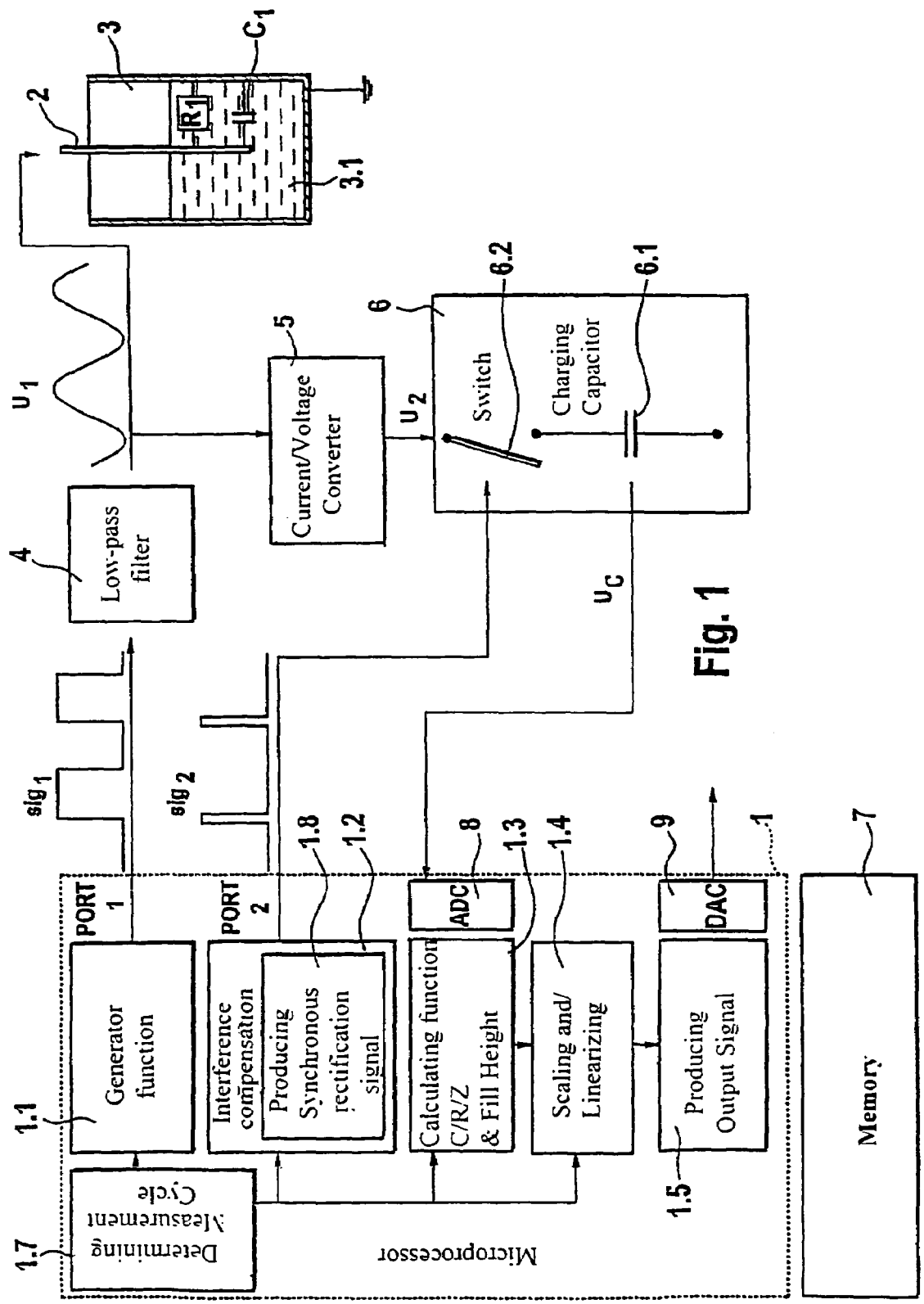
FIG. 1: Block diagram of a field device electronics for a first measuring method.
Figure 2:
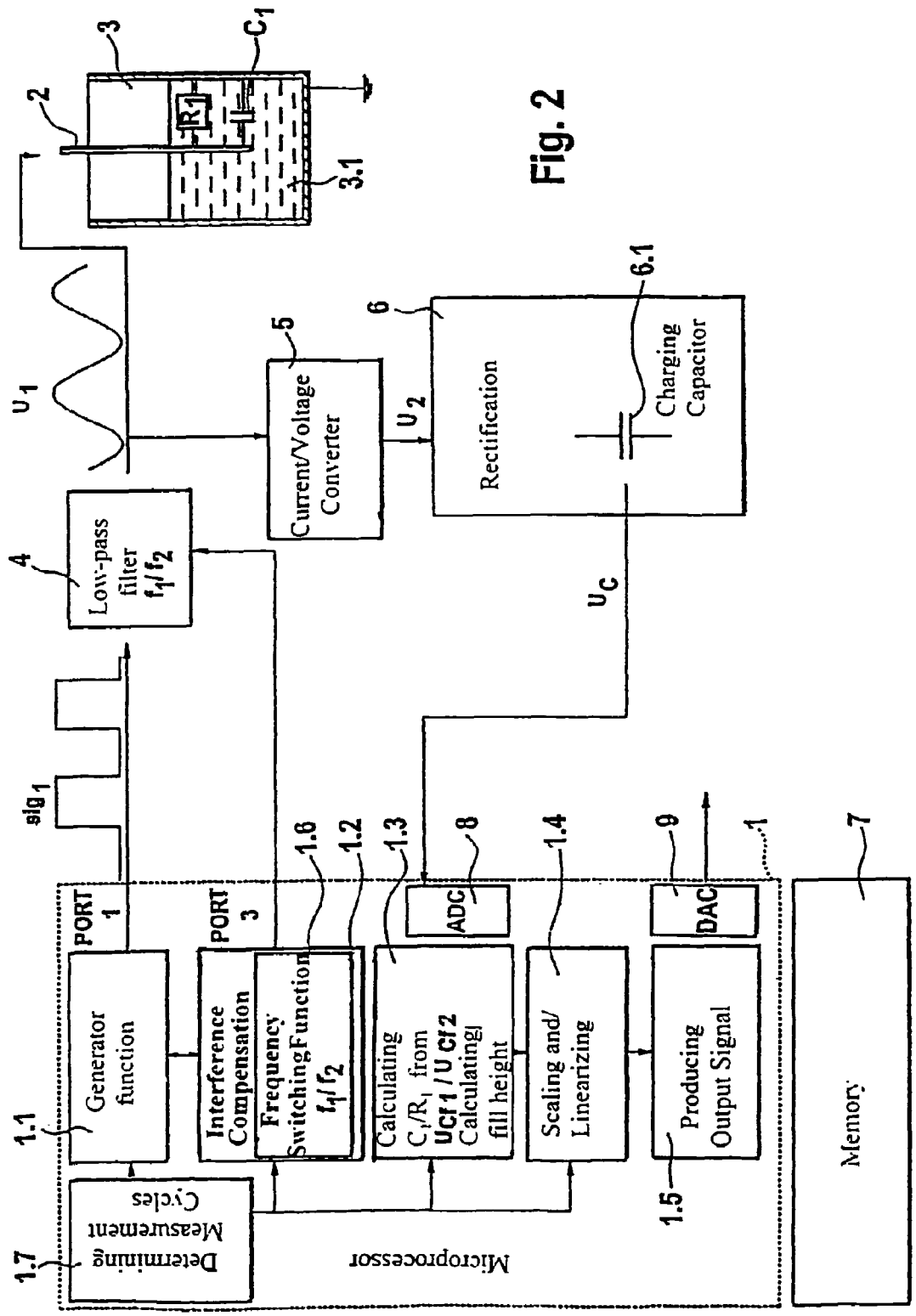
FIG. 2: Block diagram of a field device electronics for a second measuring method.

As can be seen from FIGS. 1 and 2, the field device electronics includes a microprocessor 1, a sensor 2 for determining the fill level of a medium 3.1 in a container 3, a filter 4, a current/voltage converter 5, a memory unit 7 and a rectifier 6, with the rectifier 6 including a charging capacitor 6.1.

As can be seen from FIG. 1, the microprocessor 1 includes, for performing a first measuring method, the function blocks: Generator function 1.1, interference-parameter compensation 1.2, calculating function 1.3, scaling/linerarizing 1.4, producing output signal 1.5. Additionally, there is a function block 1.7 present, "Establishing Measurement Cycle", which determines the length of the measurement cycle and the pause duration between the measurement cycles. This enables the lowering of current consumption by means of an energy saving mode. Additionally, by varying the pause durations, an increased insensitivity to stray electromagnetic interferences is achieved, since no continuous interactions between the measurement signal and the interference signal can arise.

By means of the generator function 1.1, the microprocessor 1 produces a voltage signal $sig_1$ of measuring frequency f, which is issued through PORT 1 and converted by a subsequent lowpass filtering into a sinusoidal voltage $U_1$. The generator function 1.1 is realized in the form of a frequency divider or a timer integrated in the microprocessor, so that the voltage signal is produced from the clock signal of the microprocessor.

For the interference-parameter compensation 1.2, the microprocessor 1 executes the function block 1.8, "Producing Synchronization Signal", and produces a synchronization signal $sig_2$, which has a phase-shift angle which can be set with respect to the voltage signal $sig_1$. In the illustrated embodiment, by way of example, the synchronization signal $sig_2$ is used for triggering the rectifier 6 and issued through PORT 2. Depending on the phase-shift angle set between the voltage signal $sig_1$ and the synchronization signal $sig_2$, it becomes possible to conduct a pure reactive current measurement, i.e. the phase-shift angle is set to 0°, or a pure active current measurement, i.e. a phase-shift angle of 90° is set. In this way, interfering parameters which are present, such as ohmic resistances in a capacitive measuring probe, or capacitances in a conductive measuring probe, can be eliminated.

The current/voltage converter 5 converts a current caused by the voltage signal $U_1$ in the sensor unit 2 into a proportional voltage signal $U_2$.

The rectifier 6 is provided in the form of a synchronous rectifier for the first measuring method and includes additionally to the charging capacitor 6.1 a controllable switch 6.2, which is provided, for instance, in the form of a MOSFet. Switch 6.1 is triggered by the synchronization signal $sig_2$. When the high-level of the synchronization signal $sig_2$ is applied, the charging capacitor 6.1 is charged through the switch 6.2 to the particular instantaneous level of the voltage $U_2$. In the case of a phase-shift angle of 0° set between the voltage signal $sig_1$ and the synchronization signal $sig_2$, the output voltage $U_C$ of the rectifier 6 corresponds to the reactive current portion of the current flowing through the sensor unit 2. The output voltage $U_C$ is fed through an analog/digital converter 8 to the microprocessor 1, with the analog/digital converter 8 being integrated in the microprocessor 1 in the illustrated embodiment.

The microprocessor 1 uses the calculating function 1.3 to calculate from the rectified voltage $U_C$ measured at the charging capacitor 6.1 the parameters of the sensor-container arrangement which are to be determined, for example the capacitance $C_1$ and/or the parallel resistance $R_1$ of the sensor-container arrangement.

As an additional function, the microprocessor 1 executes a scaling and linearizing 1.4 of the calculated values.

In the block 1.5, "Producing Output Signal", the microprocessor 1 produces the desired output signal, which depends on the further use of the output signal or on the utilized transmission protocol. Thus, for example, a 4-20 mA signal, a 0-10V signal, a PFM-signal (Pulse Frequency Modulation signal), a binary switching signal, etc., can be produced. It is, furthermore, imaginable, that plural output signals (4-20 mA, 0-10V, PFM-signal, a binary switching signal, etc.) be produced and issued for different transmission protocols, or application purposes, as the case may be. For producing certain standardized output signals, a digital/analog converter 9 can be integrated in the microprocessor 1.

Figure 3:
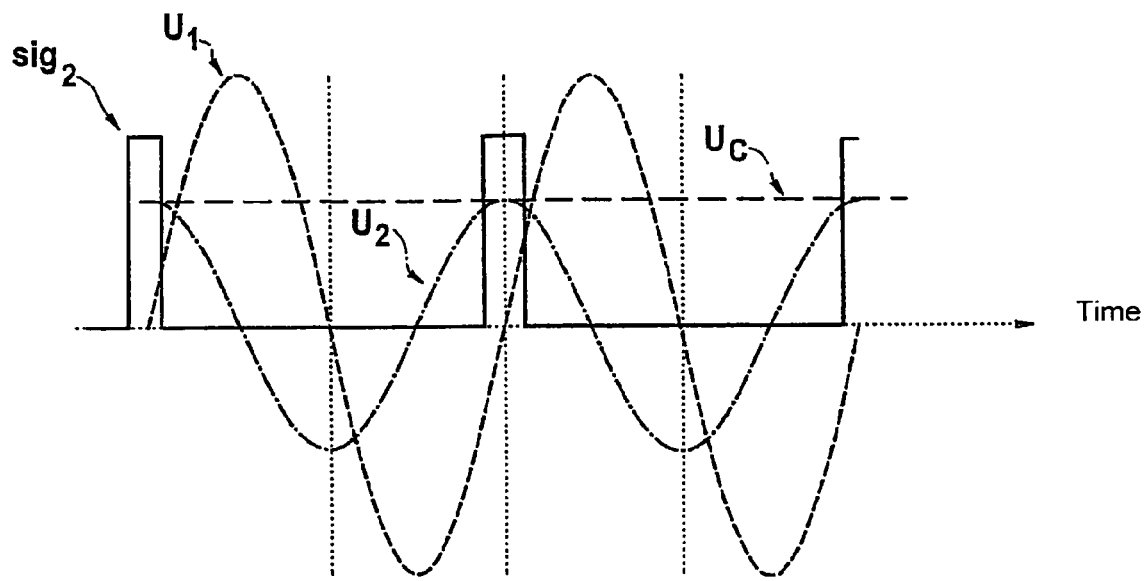
FIG. 3: Voltage as a function of time for a purely capacitive load.

FIG. 3 shows the signals $U_1$, $U_2$ and $sig_2$ as a function of time. If one assumes a purely capacitive behavior of the arrangement sensor/medium/container with capacitance $C_1$, then the voltage $U_2$, which is proportional to the current flowing through the sensor unit 2, is shifted in phase by 90° with respect to the voltage $U_1$. The charging capacitor 6.1 is charged within the time window defined by $sig_2$ to the peak value of $U_2$ in this time window, thus to the voltage $U_C$. The set phase-shift angle between the voltage signal $sig_1$ and the synchronization signal $sig_2$ is, in this case, 0°.

Figure 4:
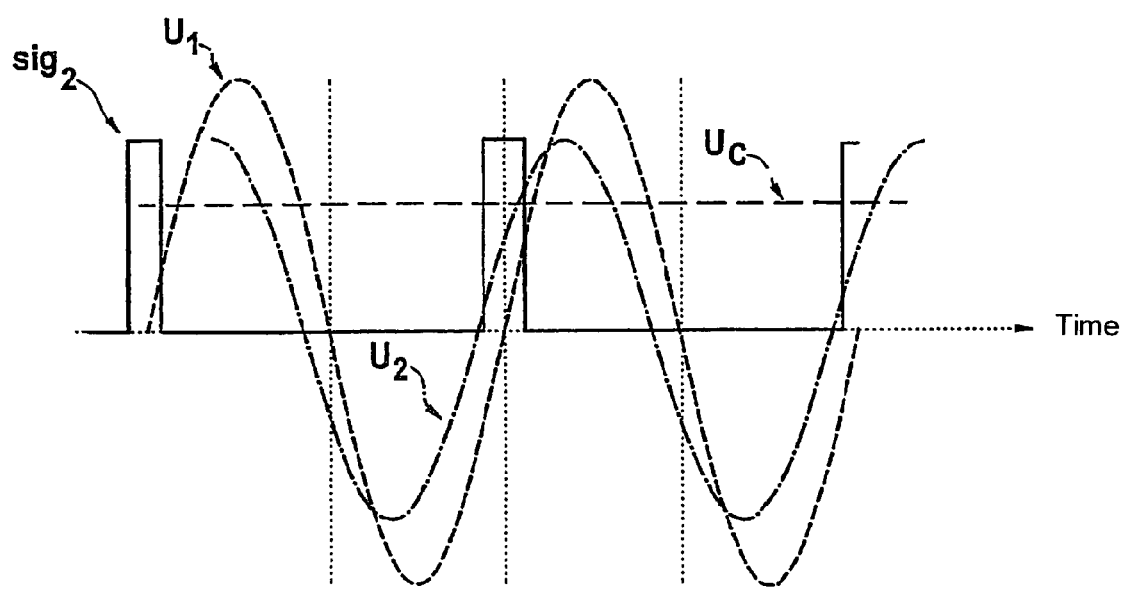
FIG. 4: Voltage as a function of time for mixed capacitive-ohmic load.

FIG. 4 likewise shows the signals $U_1$, $U_2$ and $sig_2$ as a function of time. But, now, in addition to the capacitance $C_1$, a parallel resistance $R_1$ of the medium 3.1 is taken into consideration. As can be seen from the diagram, the size of the current through the sensor unit 2 increases and, consequently, also the size of the voltage $U_2$ representing the current. The phase-shift angle between $U_1$ and $U_2$ is smaller than 90°. In this case, the size of the voltage $U_2$ in the time window defined by $sig_2$ changes only insignificantly relative to the case illustrated in FIG. 3, and, consequently, the charging capacitor 6.1 is charged to the same voltage $U_C$ as in the case of a purely capacitive loading. The set phase-shift angle between the voltage signal $sig_1$ and the synchronization signal $sig_2$ is likewise 0° and a purely reactive current measurement is performed.

In this way, it is possible to measure the capacitance $C_1$ independently of the parallel resistance $R_1$ which is present. Since many problems in the case of capacitive measurements are caused by conductive accretions and by humidity fluctuations, which change the conductivity of the medium 3.1 to be measured, this offers clear advantages for the user.

For performing an apparent current measurement, the switch 6.2 is continuously closed in the rectifier 6, i.e. the synchronization signal $sig_2$ is a continuously high signal, or a simple peak value rectifier is used.

As can be seen from FIG. 2, the microprocessor 1 for performing a second measuring method likewise includes the function blocks: Generator function 1.1, interference-parameter compensation 1.2, calculating function 1.3, scaling/linearizing 1.4, producing output signal 1.5. Additionally, there is a function block 1.7 present, "Establishing Measurement Cycle", which determines the length of the measurement cycle and the pause duration between the measurement cycles. This enables the lowering of current consumption by means of an energy saving mode. Additionally, by varying the pause durations, an increased insensitivity to stray electromagnetic interferences is achieved, since no continuous interactions between the measurement signal and the interference signal can arise.

In the case of the second measuring method, the interference-parameter compensation 1.2 includes, in contrast, a frequency switch 1.6, which determines the measuring frequency f of the voltage signal $sig_1$ produced by the generator function 1.1. For the interference-parameter compensation 1.2, the voltage signal $sig_1$ is issued through PORT 1 in predetermined time intervals alternatingly with the frequencies $f_1$ and $f_2$. A following lowpass filtering changes the voltage signal $sig_1$ to a sinusoidal measuring voltage $U_{1(f1/f2)}$, with the limit frequency of the filter 4 being set appropriately for the frequencies $f_1$, respectively $f_2$, according to the time intervals predetermined by the signal production. The setting of the limit frequencies of the filter 4 is done by a control signal produced by the frequency switch 1.6 and issued through the PORT 3. In this way, an optimum rectangular to sinusoidal conversion is always achieved for the frequencies $f_1$ and $f_2$.

The current/voltage converter 5 converts a current through the sensor unit 2 caused by the voltage signal $U_{1(f1/f2)}$ into a proportional voltage signal $U_2$.

The rectifier 6 includes a charging capacitor 6.1, produces a rectifier voltage $U_C$ proportional to $U_2$ and can be provided in the form of a conventional peak value rectifier or also a synchronous rectifier, as described above with respect to FIG. 1.

The output voltages $U_{C(f1)}$ and $U_{C(f2)}$ of the charging capacitor 6.1 are fed through an analog/digital converter to the microprocessor 1, with the analog/digital converter being integrated in the microprocessor 1 in the illustrated embodiment.

The microprocessor 1 uses the calculating function 1.3 to calculate from the voltages $U_{C(f1)}$ and $U_{C(f2)}$, measured at the charging capacitor 6.1 and rectified, the parameters of the sensor-container arrangement which are to be determined, for example the capacitance $C_1$ and/or the parallel resistance $R_1$. The calculation of the values for $C_1$ and $R_1$ from the voltages $U_{C(f1)}$ and $U_{C(f2)}$ proceeds in the following manner:

The total apparent current flowing through the sensor unit 2 is given by:

$$I_S = \sqrt{I_{C1}^2 + I_{R1}^2} \qquad [1]$$

with the current $I_{C1}$ flowing through the capacitor being frequency dependent:

$$I_{C1(f)} = U_1 \cdot 2\pi f C_1 \qquad [2]$$

Now, if one measures at two different frequencies $f_1$ and $f_2$, then the following hold:

$$|I_{S(f1)}| = \sqrt{(|U_1| \cdot 2\pi f C_1)^2 + (|U_1|/R_1)^2} \qquad [3]$$

$$|I_{S(f2)}| = \sqrt{(|U_1| \cdot 2\pi f C_1)^2 + (|U_1|/R_1)^2} \qquad [4]$$

wherein the currents $I_{S(f1)}$ and $I_{S(f2)}$, due to the current/voltage conversion and the rectification, are proportional to $U_{2(f1)}$ and $U_{2(f2)}$ and, consequently, are known. As a result, one has with the equations [3] and [4] two equations with two unknowns, from which $C_1$ and $R_1$ can be calculated.

In this way, it is possible to measure the capacitance $C_1$ independently of the parallel resistance $R_1$. Since many problems in capacitive measurements are caused by conductive accretions and by humidity fluctuations, which change the conductivity of the medium 3.1 to be measured, this offers considerable advantages for the user.

The interference-parameter compensation 1.2 proceeds thus by the production of voltage signals with different frequencies and the eliminating of associated interferences in the calculation.

Scaling and linearizing 1.4 of the measured, respectively calculated, values and the production and output of the desired output signals 1.5 occurs analogously to the discussions for FIG. 1.

An especially advantageous field device electronics combines the two measuring methods, so that both the functions blocks for the first measuring method and those for the second measuring method are realized in the microprocessor 1. The selection of the measuring method to be performed and the input of the necessary parameters (frequency, phase-shift) is done then by the user, as a function of the sensor/container arrangement and the medium 3.1 to be measured, and can be carried out by a corresponding input dialog using an input means (not shown). The selection can, however, also occur from a control location over a corresponding communication connection. Additionally, the required parameters (frequency, phase-shift) and settings can be changed by exchangeable memory units.

the invention claimed is:

1. A field device electronics comprising:
a sensor unit for capacitive fill level measurements in a container, wherein the field device electronics is connected over signal paths with said sensor unit, produces a voltage signal for driving said sensor unit, and receives and evaluates a measurement current from said sensor unit;
an analog/digital converter
a current-/voltage-converter which converts the measurement current, before the evaluation, into a measurement voltage proportional to the measurement current;
a rectifier which rectifies the measurement voltage and produces an output voltage;
a microprocessor; and
a memory unit, wherein:
said analog/digital converter digitize said output voltage;
said microprocessor performs the production of said voltage signal, the evaluation of the measurement current and a compensation of interference parameters, and a determining of the parameters of the sensor-container arrangement which are to be determined, according to predetermined program routines; and
said parameters of said sensor unit-containers arrangement which are to be determined are an impedance and/or a capacitance and/or a conductivity;
said program routines for performing of said microprocessor are stored in said memory unit;
said microprocessor determines and evaluates the value of the measurement current at a certain phase-shift angle with reference to said voltage signal;
said rectifier is a synchronous rectifier;
said microprocessor produces a synchronization signal of said synchronous rectifier;
said certain phase-shift angle between said voltage signal and said measurement current is set by a phase-shift of said synchronization signal with respect to said voltage signal, which phase-shift is produced by said microprocessor; and
depending on the phase-shift angle which has been set, an apparent current measurement or a pure reactive current measurement or a pure active current measurement is performed.

2. The field device electronics as claimed in claim 1, wherein:
said microprocessor produces the voltage signal with a generator function, and
the measurement frequency of the voltage signal is settable by said microprocessor.

3. The field device electronics as claimed in claim 2, wherein:
said microprocessor executes a frequency switching function for producing voltage signals of different frequencies; and
the current measuring frequency of the generator function is set by the frequency switching function.

4. The field device electronics as claimed in claim 3, wherein:
said lowpass filter has settable limit frequencies; and
the current limit frequency of said lowpass filter is set by said frequency switching function.

5. The field device electronics as claimed in claim 1, further comprising:
a lowpass filter, wherein:
said lowpass filter converts the voltage signal into a sinusoidal voltage.

6. The field device electronics as claimed in claim 1, wherein:
said rectifier includes a charging capacitor.

7. The field device electronics as claimed in claim 1, wherein:
said microprocessor alternatingly produces two voltage signals of different frequencies and determines from measurement currents which are measured after driving said sensor unit with said voltage signals the parameters of the sensor-container arrangement which are to be determined.

8. The field device electronics as claimed in claim 1, wherein:
said microprocessor sets the frequency of said voltage signal and/or the phase-shift angle for evaluation of the measurement current as a function of the parameters of the sensor-container arrangement to be determined and/or the field conditions.

9. The field device electronics as claimed in claim 8, wherein:
the field condition include the sensor-unit/container-geometry and/or type of medium in the container and/or interference parameters.

10. The field device electronics as claimed in claim 1, wherein:
a variable pause is provided between the measurement cycles, and the length of the pause is set by said microprocessor.

11. The field device electronics as claimed in claim 10, wherein:
the length of the pause is continuously changed.

12. The field device electronics as claimed in claim 11, wherein:
the length of the pause is set by a random generator function.

13. The field device electronics as claimed in claim 10, wherein:
during the pauses, the field device electronics is switched into an energy saving mode.

* * * * *